US012238175B2

(12) United States Patent
Katayama (10) Patent No.: US 12,238,175 B2
(45) Date of Patent: Feb. 25, 2025

(54) COMMUNICATION APPARATUS AND AN INFORMATION PROCESSING METHOD FOR PERFORMING COMMUNICATION ACCORDING TO AN MQTT PROTOCOL (71) Applicant: TOYOTA JIDOSHA KABUSHIKI KAISHA, Toyota (JP)

(72) Inventor: Tadakazu Katayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/467,294

(22) Filed: Sep. 14, 2023

(65) Prior Publication Data
US 2024/0098144 A1 Mar. 21, 2024

(30) Foreign Application Priority Data
Sep. 16, 2022 (JP) .................. 2022-148355

(51) Int. Cl.
*H04L 67/12* (2022.01)
*H04L 61/4588* (2022.01)
(52) U.S. Cl.
CPC .......... *H04L 67/12* (2013.01); *H04L 61/4588* (2022.05)
(58) Field of Classification Search
CPC ........................ H04L 67/12; H04L 61/4588
See application file for complete search history.

(56) References Cited

U.S. PATENT DOCUMENTS

2021/0152639 A1* 5/2021 Madden .................. H04L 67/55
2023/0360448 A1* 11/2023 Fang ...................... H04L 67/125
2024/0127647 A1* 4/2024 Komiyama ............. H04W 4/40

FOREIGN PATENT DOCUMENTS

JP 2019-028757 A 2/2019

* cited by examiner

Primary Examiner — Chris Parry
Assistant Examiner — Steven C Nguyen
(74) Attorney, Agent, or Firm — Sughrue Mion, PLLC (57) ABSTRACT

An object is to confirm that information transmitted to an onboard apparatus mounted on a vehicle has been transmitted to the onboard apparatus. A communication apparatus is mounted on a vehicle and performs specific communication according to an MQTT protocol. A controller of the communication apparatus receives first information transmitted to an onboard apparatus mounted on the vehicle from an external apparatus, which is a transmission source of the first information, by the specific communication, and transmits the received first information to the onboard apparatus. The controller of the communication apparatus receives second information showing that the onboard apparatus has completed reception of the first information, from the onboard apparatus. Then, when receiving the second information, the controller of the communication apparatus transmits third information notifying that the onboard apparatus has completed reception of the first information, to the external apparatus by the specific communication.

12 Claims, 7 Drawing Sheets

| TOPIC INFORMATION | | |
|---|---|---|
| APPARATUS ID | TOPIC | TRANSMISSION DESTINATION |
| *** | *** | *** |
| ... | ... | ... |

Fig. 3

| APPARATUS INFORMATION | | |
|---|---|---|
| APPARATUS ID | TOPIC | ADDRESS |
| *** | *** | *** |
| ... | ... | ... |

COMMUNICATION APPARATUS AND AN INFORMATION PROCESSING METHOD FOR PERFORMING COMMUNICATION ACCORDING TO AN MQTT PROTOCOL

CROSS REFERENCE TO THE RELATED APPLICATION

This application claims the benefit of Japanese Patent Application No. 2022-148355, filed on Sep. 16, 2022, which is hereby incorporated by reference herein in its entirety.

BACKGROUND

Technical Field

The present disclosure relates to a communication apparatus, an information processing method, and an information processing apparatus.

Description of the Related Art

Japanese Patent Laid-Open No. 2019-028757 discloses a server system that collects pieces of operation information about at least one collection target apparatus via a network. The server system disclosed in Japanese Patent Laid-Open No. 2019-028757, performs a first communication process in which, after establishment of communication connection, the communication connection established state is maintained, and a second communication process in which, after establishment of communication connection, the communication connection is disconnected when information is received. The server system receives first information, among the pieces of operation information, by the first communication process, and receives second information, among the pieces of operation information, by the second communication process. Then, if the received first information is of a predetermined classification, the server system gives a push notification to a terminal apparatus.

SUMMARY

An object of the present disclosure is to confirm that information transmitted to an onboard apparatus mounted on a vehicle has been transmitted to the onboard apparatus.

A communication apparatus according to a first aspect of the present disclosure is a communication apparatus mounted on a vehicle and performing specific communication according to an MQTT protocol, the communication apparatus comprising a controller comprising at least one processor configured to execute:
receiving first information transmitted to an onboard apparatus mounted on the vehicle from an external apparatus, which is a transmission source of the first information, by the specific communication;
transmitting the received first information to the onboard apparatus;
receiving second information showing that the onboard apparatus has completed reception of the first information, from the onboard apparatus; and
transmitting, when receiving the second information, third information notifying that the onboard apparatus has completed reception of the first information, to the external apparatus by the specific communication.

An information processing method according to a second aspect of the present disclosure is an information processing method executed by a communication apparatus mounted on a vehicle and performing specific communication according to an MQTT protocol, the information processing method comprising:
receiving first information transmitted to an onboard apparatus mounted on the vehicle from an external apparatus, which is a transmission source of the first information, by the specific communication;
transmitting the received first information to the onboard apparatus;
receiving second information showing that the onboard apparatus has completed reception of the first information, from the onboard apparatus; and
transmitting, when receiving the second information, third information notifying that the onboard apparatus has completed reception of the first information, to the external apparatus by the specific communication.

An information processing apparatus according to a third aspect of the present disclosure is an information processing apparatus performing specific communication according to an MQTT protocol, with a communication apparatus mounted on a vehicle, the communication apparatus comprising a controller comprising at least one processor configured to execute:
transmitting first information transmitted to an onboard apparatus mounted on the vehicle, and a topic specifying the external apparatus, which is a transmission source of the first information, as a transmission destination of second information notifying that the onboard apparatus has completed reception of the first information, to the communication apparatus by the specific communication; and
transmitting, when receiving the second information with which the topic is associated, the second information to the external apparatus.

According to the present disclosure, it becomes possible to confirm that information transmitted to an onboard apparatus mounted on a vehicle has been transmitted to the onboard apparatus.

DESCRIPTION OF THE EMBODIMENTS

A communication apparatus according to a first aspect of the present disclosure is a communication apparatus that performs specific communication according to the MQTT (Message Queuing Telemetry Transport) protocol. The communication apparatus according to the first aspect of the present disclosure is mounted on a vehicle. Here, a case will be assumed where an external apparatus transmits first information to an onboard apparatus mounted on the vehicle, using the MQTT protocol. In this case, the specific communication is performed between the external apparatus and the communication apparatus. The MQTT protocol is a Pub/Sub type communication protocol. That is, information is transmitted to the communication apparatus, which is a subscriber, from the external apparatus via a publisher and a broker. On the other hand, between the communication apparatus and the onboard apparatus, communication is performed by a communication protocol other than the MQTT protocol. In the specific communication, when the subscriber receives information, it is possible to notify the external apparatus thereof via the broker and the publisher. When the communication apparatus further transfers the first information to the onboard apparatus, however, it is not possible to notify the external apparatus whether the onboard apparatus has received the first information or not. Therefore, by a communication apparatus according to the present disclosure, the problem is solved that it is not possible to confirm that the onboard apparatus has completed reception of the first information transmitted to the onboard apparatus.

A controller comprising at least one processor of the communication apparatus according to the first aspect of the present disclosure receives the first information transmitted to the onboard apparatus mounted on the vehicle from the external apparatus. Here, the external apparatus is an apparatus which is a transmission source of the first information. The controller of the communication apparatus transmits the received first information to the onboard apparatus. In this way, by the first information being transferred to the onboard apparatus by the communication apparatus, transmission of the first information to the onboard apparatus is performed. After that, the controller receives second information showing that the onboard apparatus has completed reception of the first information, from the onboard apparatus. Then, the controller transmits third information to the external apparatus by the specific communication. Here, the third information is information notifying that the onboard apparatus has completed reception of the first information.

As described above, when the onboard apparatus has completed reception of the first information, the third information is transmitted to the external apparatus. Thereby, the external apparatus can grasp that the onboard apparatus has completed reception of the first information. As a result, it becomes possible to, even in a form in which a communication system based on the MQTT protocol and an in-vehicle communication system are combined, the external apparatus can confirm that the first information has been received by the onboard apparatus.

A specific embodiment of the present disclosure will be described below based on drawings. Sizes, materials, and shapes of components, relative arrangement of the components, and the like described in the present embodiment are not intended to limit the technical scope of the present disclosure only thereto unless otherwise stated.

First Embodiment (Outline of System)

Figure 1:
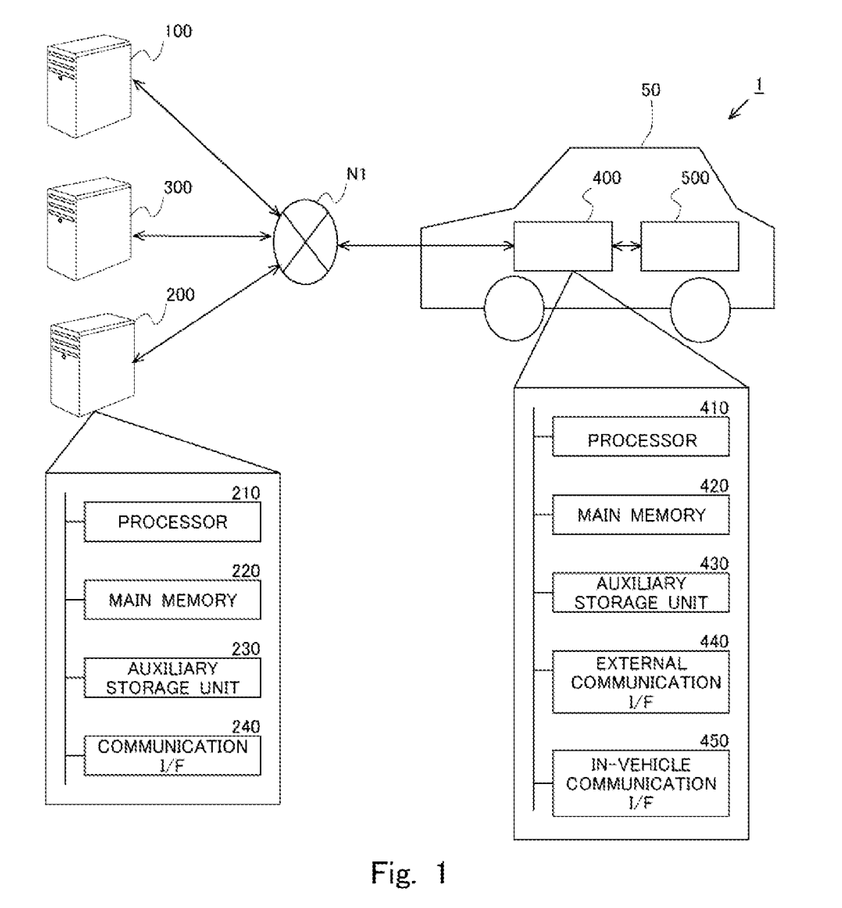
FIG. 1 is a diagram illustrating a schematic configuration of a communication system.

A communication system 1 in the present embodiment will be described based on FIG. 1. FIG. 1 is a diagram illustrating a schematic configuration of the communication system 1. The communication system 1 is configured, including an external apparatus 100, a publisher server 200, a broker server 300, a communication apparatus 400, and an onboard apparatus 500. In the communication system 1, the external apparatus 100, the publisher server 200, the broker server 300, and the communication apparatus 400 are mutually connected via a network N1. As the network N1, for example, a WAN (wide area network) which is a worldwide public communication network such as the Internet, or a telephone communication network for mobile phones and the like may be adopted. Further, in the communication system 1, the communication apparatus 400 and the onboard apparatus 500 are mutually connected via an in-vehicle network of a vehicle 50.

(External Apparatus)

The external apparatus 100 is an apparatus that transmits specific information to the onboard apparatus 500 mounted on the vehicle 50. The specific information is, for example, update information for updating an application installed in the onboard apparatus 500. The specific information may be, for example, specific information for giving an instruction to the onboard apparatus 500. The external apparatus 100 is, for example, a terminal used by the manufacturer of the onboard apparatus 500.

The external apparatus 100 transmits the specific information by communication according to the MQTT protocol (which may be hereinafter referred to as "specific communication") via the network N1. The specific information reaches the onboard apparatus 500 via the communication apparatus 400. The external apparatus 100 receives information notifying that the onboard apparatus 500 has completed reception of the specific information (which may be hereinafter referred to as "notification information") from the communication apparatus 400 via the broker server 300 and the publisher server 200. Thereby, the external apparatus 100 can grasp that the onboard apparatus 500 has completed reception of the specific information. As described above, the external apparatus 100 receives the notification information as a result of transmission of the specific information to the onboard apparatus 500. Details of methods for the external apparatus 100 to transmit/receive the specific information and to transmit/receive the notification information by the specific communication will be described later.

(Publisher Server)

The publisher server 200 is a publisher in the MQTT protocol. The publisher server 200 receives the specific information from the external apparatus 100 by the specific communication. Then, the publisher server 200 transmits the specific information to the broker server 300 by the specific communication. Further, the publisher server 200 receives the notification information generated by the communication apparatus 400 via the broker server 300. Then, the publisher server 200 transmits the notification information to the external apparatus 100 by the specific communication. Details of methods for the publisher server 200 to transmit/receive the specific information and to transmit/receive the notification information by the specific communication will be described later.

The publisher server 200 is configured, including a computer having a processor 210, a main memory 220, an auxiliary storage unit 230, and a communication interface (a communication I/F) 240. The processor 210 is, for example, a CPU (central processing unit) or a DSP (digital signal processor). The main memory 220 is, for example, a RAM (random access memory). The auxiliary storage unit 230 is, for example, a ROM (read-only memory). Further, the auxiliary storage unit 230 is, for example, an HDD (hard disk drive) or a disc recording medium such as a CD-ROM, a DVD disc, or a Blu-ray disc. The auxiliary storage unit 230 may be a removable medium (a portable storage medium).

Here, as the removable medium, for example, a USB memory or an SD card is exemplified. The communication I/F 240 is, for example, a LAN (local area network) interface board or a wireless communication circuit for wireless communication.

In the publisher server 200, an operating system (OS), various kinds of programs, various kinds of information tables, and the like are stored in the auxiliary storage unit 230. In the publisher server 200, by the processor 210 loading a program stored in the auxiliary storage unit 230 to the main memory 220 and executing the program, various kinds of functions as described later can be realized. A part or all of the functions of the publisher server 200, however, may be realized by a hardware circuit such as an ASIC or an FPGA. The publisher server 200 does not necessarily have to be realized by a single physical component but may be configured with a plurality of computers that work in cooperation with one another. The external apparatus 100 is also configured, including a computer similarly to the publisher server 200.

(Broker Server)

The broker server 300 is a broker in the MQTT protocol. The broker server 300 receives the specific information from the publisher server 200 by the specific communication. Then, the broker server 300 transmits the specific information to the communication apparatus 400 by the specific communication. Further, the broker server 300 receives the notification information from the communication apparatus 400 by the specific communication. Then, the broker server 300 transmits the notification information to the publisher server 200 by the specific communication. Details of methods for the broker server 300 to transmit/receive the specific information and to transmit/receive the notification information by the specific communication will be described later. The broker server 300 is also configured, including a computer similarly to the publisher server 200.

(Communication Apparatus)

The communication apparatus 400 is a communication apparatus mounted on the vehicle 50. The communication apparatus 400 receives the specific information from the broker server 300 by the specific communication. Then, the communication apparatus 400 transmits the specific information to the onboard apparatus 500 via the in-vehicle network. Here, the specific communication by the MQTT protocol is performed between the external apparatus 100 and the communication apparatus 400. Therefore, the specific information is transmitted to the communication apparatus 400, which is a subscriber, from the external apparatus 100 via the publisher server 200 and the broker server 300. On the other hand, between the communication apparatus 400 and the onboard apparatus 500, communication is performed by a communication protocol other than the MQTT protocol via the in-vehicle network. In the specific communication, when the communication apparatus 400, which is a subscriber, receives information, it is possible to notify the external apparatus 100 thereof via the broker server 300 and the publisher server 200. When the communication apparatus 400 further transfers the specific information to the onboard apparatus 500, however, it is not possible to notify the external apparatus 100 whether the onboard apparatus 500 has received the specific information or not.

Therefore, the communication apparatus 400 receives information showing that the onboard apparatus 500 has completed reception of the specific information (which may be hereinafter referred to as "completion information") from the onboard apparatus 500 via the in-vehicle network. When receiving the completion information from the onboard apparatus 500, the communication apparatus 400 transmits the notification information to the broker server 300 by the specific communication. Details of methods for the broker server 300 to transmit/receive the specific information, to receive the completion information from the onboard apparatus 500, and to transmit the notification information to the broker server 300 will be described later.

The communication apparatus 400 is configured, including a computer having a processor 410, a main memory 420, an auxiliary storage unit 430, an external communication interface (an external communication I/F) 440, and an in-vehicle communication interface (an in-vehicle communication I/F) 450. Since the processor 410, the main memory 420, the auxiliary storage unit 430, and the external communication I/F 440 are similar to the processor 210, the main memory 220, the auxiliary storage unit 230, and the communication I/F 240 of the publisher server 200, description thereof will be omitted. The in-vehicle communication I/F 450 can be realized by a communication interface for the in-vehicle network, which the vehicle 50 is provided with.

(Onboard Apparatus)

The onboard apparatus 500 is an apparatus mounted on the vehicle 50. The onboard apparatus 500 is, for example, an ECU of the vehicle 50. The onboard apparatus 500 receives the specific information via the in-vehicle network, from the communication apparatus 400 that has received the specific information from the external apparatus 100 via the publisher server 200 and the broker server 300. When receiving the specific information, the onboard apparatus 500 performs predetermined information processing based on the specific information. Here, the predetermined information processing is information processing for updating the application installed in the onboard apparatus 500. Further, the predetermined information processing may be information processing to execute an instruction to the onboard apparatus 500, which is included in the specific information. When having completed reception of the specific information, the onboard apparatus 500 transmits the completion information to the communication apparatus 400. The onboard apparatus 500 is configured, including a computer having a processor, a main memory, an auxiliary storage unit, and an in-vehicle communication I/F similar to the computer of the communication apparatus 400.

(Functional Configuration)

Figure 2:
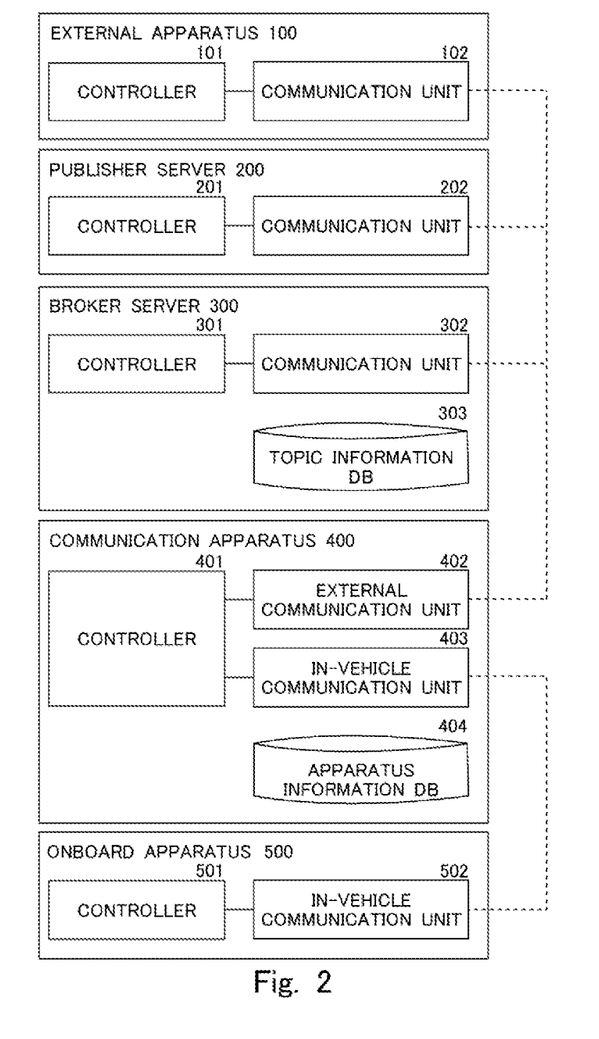
FIG. 2 is a diagram schematically illustrating an example of functional configurations of an external apparatus, a publisher server, a broker server, a communication apparatus, and an onboard apparatus.

Next, functional configurations of the external apparatus 100, the publisher server 200, the broker server 300, the communication apparatus 400, and the onboard apparatus 500 that constitute the communication system 1 according to the present embodiment will be described based on FIGS. 2 to 4. FIG. 2 is a diagram schematically illustrating an example of the functional configurations of the external apparatus 100, the publisher server 200, the broker server 300, the communication apparatus 400, and the onboard apparatus 500.

(External Apparatus)

The external apparatus 100 is configured, including a controller 101 and a communication unit 102. The controller 101 has a function of performing arithmetic processing for controlling the external apparatus 100. The controller 101 can be realized by a processor of the external apparatus 100. The communication unit 102 has a function of connecting the external apparatus 100 to the network N1. The communication unit 102 can be realized by a communication I/F of the external apparatus 100.

The controller 101 transmits specific information to the publisher server 200 by the specific communication, by the communication unit 102. At this time, the controller 101 transmits a topic specifying the onboard apparatus 500 as a transmission destination of the specific information (which may be hereinafter referred to as "transmission topic") to the publisher server 200 together with the specific information by the specific communication. In this way, the controller 101 transmits the specific information with which the transmission topic is associated, to the publisher server 200 by the specific communication. Further, the controller 101 receives notification information from the publisher server 200 by the specific communication, by the communication unit 102. Thereby, the controller 101 can grasp that the onboard apparatus 500 has completed reception of the specific information.

(Publisher Server)

The publisher server 200 is configured, including a controller 201 and a communication unit 202. The controller 201 has a function of performing arithmetic processing for controlling the publisher server 200. The controller 201 can be realized by the processor 210 of the publisher server 200. The communication unit 202 has a function of connecting the publisher server 200 to the network N1. The controller 201 can be realized by the communication I/F 240 of the publisher server 200.

The controller 201 receives the specific information and the transmission topic from the external apparatus 100 by the specific communication, by the communication unit 202. The controller 201 transmits a topic specifying the external apparatus 100 as a transmission destination of the notification information (which may be hereinafter referred to as "a reply topic") to the broker server 300 together with the specific information and the transmission topic by the specific communication, by the communication unit 202. In this way, the controller 201 transmits the specific information with which the transmission topic is associated and the reply topic to the broker server 300. Further, the controller 201 receives the notification information from the broker server 300 by the specific communication, by the communication unit 202. At this time, the reply topic is associated with the notification information received by the controller 201. Therefore, the controller 201 transmits the received notification information to the external apparatus 100 by the specific communication, by the communication unit 202.

(Broker Server)

The broker server 300 is configured, including a controller 301, a communication unit 302, and a topic information database (a topic information DB) 303. The controller 301 has a function of performing arithmetic processing for controlling the broker server 300. The controller 301 can be realized by a processor of the broker server 300. The communication unit 302 has a function of connecting the broker server 300 to the network N1. The controller 301 can be realized by a communication I/F of the broker server 300.

The topic information DB 303 has a function of holding topic information. The topic information is information for, when the broker server 300 receives information with which a topic is associated, identifying a transmission destination of the information based on the topic. The topic information DB 303 can be realized by an auxiliary storage unit of the broker server 300. FIG. 3 is a diagram illustrating an example of a configuration of a table of the topic information held in the topic information DB 303.

Figure 3:
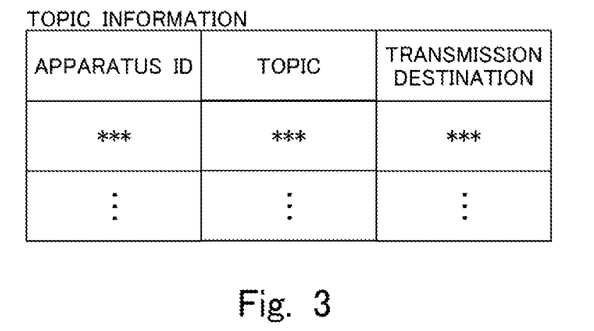
FIG. 3 is a diagram illustrating an example of a configuration of a table of topic information held in a topic information database.

As illustrated in FIG. 3, the topic information has apparatus ID fields, topic fields, and transmission destination fields. In the apparatus ID fields, identifiers (apparatus IDs) for identifying apparatuses (a plurality of apparatuses including the communication apparatus 400) to which the broker server 300 transmits information are input, respectively. In the topic fields, topics specifying the apparatus IDs input in the apparatus ID fields as information transmission destinations are input, respectively. The controller 301 identifies a topic field in which a topic corresponding to a topic associated with information is input, and decides an apparatus of an apparatus ID input in an apparatus ID field corresponding to the topic field as a transmission destination of the information. In each of the transmission destination fields, information for identifying a transmission destination of information to an apparatus corresponding to an apparatus ID input in a corresponding apparatus ID field (for example, a network address of the communication apparatus 400). In the topic information, the apparatus ID of the communication apparatus 400, a transmission topic, and a transmission destination of information to the communication apparatus 400 are input.

The controller 301 receives the specific information, the transmission topic, and the reply topic from the publisher server 200 by the specific communication, by the communication unit 302. Here, the transmission topic is associated with the specific information. Therefore, the controller 301 identifies that the communication apparatus 400 is a transmission destination of the specific information based on the topic information held in the topic information DB 303 and the transmission topic. Therefore, the controller 301 transmits the specific information, the transmission topic, and the reply topic to the communication apparatus 400 by the specific communication, by the communication unit 302.

Further, the controller 301 receives the notification information from the communication apparatus 400 by the specific communication, by the communication unit 302. At this time, the reply topic is associated with the notification information. Therefore, the controller 301 identifies that the publisher server 200 is a transmission destination of the notification information based on the topic information held in the topic information DB 303 and the reply topic. The controller 301 transmits the received notification information to the publisher server 200 by the specific communication, by the communication unit 302.

(Communication Apparatus)

The communication apparatus 400 is configured, including a controller 401, an external communication unit 402, an in-vehicle communication unit 403, and an apparatus information database (an apparatus information DB) 404. The controller 401 has a function of performing arithmetic processing for controlling the communication apparatus 400. The controller 401 can be realized by the processor 410 of the communication apparatus 400. The external communication unit 402 has a function of connecting the communication apparatus 400 to the network N1. The external communication unit 402 can be realized by the external communication I/F 440 of the communication apparatus 400. The in-vehicle communication unit 403 has a function of connecting the communication apparatus 400 to the in-vehicle network of the vehicle 50. The in-vehicle communication unit 403 can be realized by the in-vehicle communication I/F 450 of the communication apparatus 400.

The apparatus information DB 404 has a function of holding apparatus information. The apparatus information is information for, when the communication apparatus 400 receives information with which a topic is associated, identifying a transmission destination (an apparatus mounted on the vehicle 50) of the information based on the topic. In the present embodiment, the apparatus information is held in the apparatus information DB 404 in advance. The apparatus information DB 404 can be realized by the auxiliary storage unit 430 of the communication apparatus 400. FIG. 4 is a diagram illustrating an example of a configuration of a table of the apparatus information held in the apparatus information DB 404.

Figure 4:
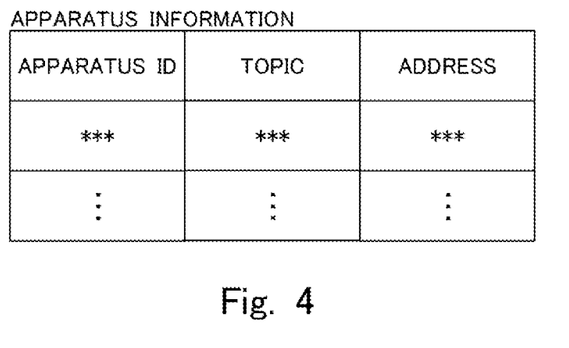
FIG. 4 is a diagram illustrating an example of a configuration of a table of apparatus information held in an apparatus information database.

As illustrated in FIG. 4, the apparatus information has apparatus ID fields, topic fields, and address fields. In the apparatus ID fields, identifiers (apparatus IDs) for identifying apparatuses mounted on the vehicle 50 are input, respectively. In the present embodiment, a plurality of apparatuses including the onboard apparatus 500 are mounted on the vehicle 50. In the topic fields, topics identifying apparatuses of apparatus IDs input in the apparatus ID fields as transmission destinations are input, respectively. The controller 401 identifies a topic field in which a topic corresponding to a topic associated with information is input, and decides an apparatus of an apparatus ID input in an apparatus ID field corresponding to the topic field as a transmission destination of the information. In the address fields, network addresses of the apparatuses with the apparatus ID input in the apparatus ID fields in the in-vehicle network are input, respectively. In the apparatus information, the apparatus ID of the onboard apparatus 500, a transmission topic, and a network address of the onboard apparatus 500 in the in-vehicle network are input.

The controller 401 receives the specific information, the transmission topic, and the reply topic from the broker server 300 by the specific communication, by the external communication unit 402. At this time, the transmission topic is associated with the specific information. Therefore, the controller 401 identifies that the onboard apparatus 500 is a transmission destination of the specific information based on the apparatus information held in the apparatus information DB 404 and the transmission topic. Therefore, the controller 401 transmits the specific information to the onboard apparatus 500 by the in-vehicle communication unit 403.

Further, the controller 401 receives completion information from the onboard apparatus 500, by the in-vehicle communication unit 403. When receiving the completion information, the controller 401 transmits the notification information to the broker server 300 together with the reply topic received in advance. Thereby, the controller 401 transmits the notification information with which the reply topic is associated, to the broker server 300 by the specific communication. Then, the notification information is transmitted to the external apparatus 100 via the broker server 300 and the publisher server 200. In this way, the controller 401 transmits the notification information to the external apparatus 100 using the reply topic.

(Onboard Apparatus)

The onboard apparatus 500 is configured, including a controller 501 and an in-vehicle communication unit 502. The controller 501 can be realized by the processor of the onboard apparatus 500. The in-vehicle communication unit 502 has a function of connecting the onboard apparatus 500 to the in-vehicle network of the vehicle 50. The in-vehicle communication unit 502 can be realized by the in-vehicle communication I/F of the onboard apparatus 500.

The controller 501 receives the specific information from the communication apparatus 400, by the in-vehicle communication unit 502. When having completed reception of the specific information, the controller 501 transmits the completion information to the communication apparatus 400. Thereby, the communication apparatus 400 can grasp that the onboard apparatus 500 has completed reception of the specific information.

(Flow of Information Processing)

Figure 5:
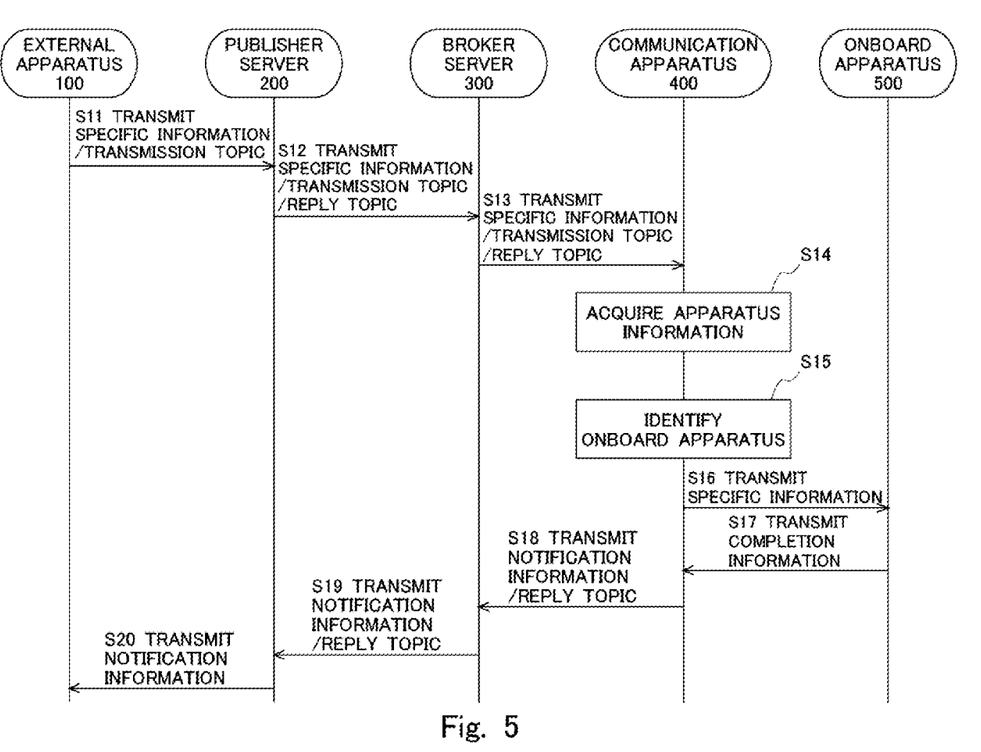
FIG. 5 is a first sequence diagram illustrating a flow of information processing in the communication system.

Next, a flow of information processing in the communication system 1 will be described based on FIG. 5. FIG. 5 is a first sequence diagram illustrating the flow of the information processing in the communication system 1. Processes executed by the external apparatus 100, the publisher server 200, the broker server 300, the communication apparatus 400, and the onboard apparatus 500 are executed by the controller 101, the controller 201, the controller 301, the controller 401, and the controller 501, respectively.

In the communication system 1, the external apparatus 100 transmits specific information and a transmission topic to the publisher server 200 by the specific communication so that the transmission topic is associated with the specific information (S11). Next, the publisher server 200 transmits the specific information, the transmission topic, and a reply topic to the broker server 300 by the specific communication (S12). Next, the broker server 300 transmits the specific information, the transmission topic, and the reply topic to the communication apparatus 400 by the specific communication (S13). In this way, by the publisher server 200 transmitting the reply topic to the broker server 300, it is possible to notify the communication apparatus 400 of the reply topic via the broker server 300.

Next, the communication apparatus 400 acquires the apparatus information held in the apparatus information DB 404 (S14). Here, since the transmission topic is associated with the specific information, the communication apparatus 400 identifies the onboard apparatus 500 as a transmission destination of the specific information, based on the acquired apparatus information and the transmission topic (S15). Next, the communication apparatus 400 transmits the specific information to the onboard apparatus 500 via the in-vehicle network (S16). Next, when having completed reception of the specific information, the onboard apparatus 500 transmits completion information to the communication apparatus 400 (S17).

When receiving the completion information, the communication apparatus 400 transmits notification information and the reply topic to the broker server 300 by the specific communication so that the reply topic is associated with the notification information (S18). Then, the broker server 300 transmits the notification information and the reply topic to the publisher server 200 by the specific communication (S19). Then, the publisher server 200 transmits the notification information to the external apparatus 100 by the specific communication (S20). Thereby, the external apparatus 100 can grasp that the onboard apparatus 500 has completed reception of the specific information.

As described above, by the communication system 1, the external apparatus 100 can receive the notification information when the onboard apparatus 500 has completed reception of the specific information. Therefore, the external apparatus 100 can grasp that the onboard apparatus 500 has completed reception of the specific information. As a result, it becomes possible to confirm that the specific information has been transmitted to the onboard apparatus 500.

(Modification)

In the present embodiment, a reply topic is transmitted to the communication apparatus 400 by the publisher server 200. Then, the communication apparatus 400 associates the received reply topic with notification information and transmits the notification information to the broker server 300 by the specific communication. The communication apparatus 400, however, does not necessarily have to associate the received reply topic with the notification information and transmit the notification information to the broker server 300 by the specific communication. The communication apparatus 400 may associate, for example, a reply topic held in advance in the apparatus information held in the apparatus information DB 404 with the notification information. That is, the communication apparatus 400 may transmit the notification information with which a reply topic specified in advance is associated, to the broker server 300. In this case also, it becomes possible to confirm that the specific information has been transmitted to the onboard apparatus 500.

Second Embodiment

In the present embodiment, the communication apparatus 400 receives a transmission topic and the address of the onboard apparatus 500 in the in-vehicle network of the vehicle 50, for the communication apparatus 400 transmitting specific information to the onboard apparatus 500 (which may be hereinafter referred to as "a specific address") from the onboard apparatus 500. Hereinafter, points different from the first embodiment will be described.
(Onboard Apparatus)

The controller 501 transmits the transmission topic and the specific address to the communication apparatus 400, by the in-vehicle communication unit 502. The controller 501 transmits the transmission topic and the specific address to the communication apparatus 400 by acquiring the transmission topic specified in advance and the specific address from the auxiliary storage unit of the onboard apparatus 500. Here, for example, at a timing specified in advance as the timing of the onboard apparatus 500 receiving the specific information, the controller 501 transmits the apparatus ID of the onboard apparatus 500, the transmission topic, and the specific address to the communication apparatus 400, by the in-vehicle communication unit 502.
(Communication Apparatus)

The controller 401 registers the apparatus ID, the transmission topic, and the specific address received from the onboard apparatus 500 by the in-vehicle communication unit 403, with the apparatus information DB 404. Thereby, the controller 401 can identify the specific address of the onboard apparatus 500 based on the apparatus information held in the apparatus information DB 404, and the specific information and the transmission topic received from the broker server 300. Thereby, the controller 401 can transmit the specific information to the onboard apparatus 500 by the in-vehicle communication unit 403.

Further, the controller 401 transmits request information to the broker server 300 by the specific communication, by the external communication unit 402. Here, the request information is information for requesting the broker server 300 to register the communication apparatus 400 as a subscriber of the transmission topic received from the onboard apparatus 500. The request information is information that includes the apparatus ID of the communication apparatus 400, the transmission topic, and the transmission destination of information to the communication apparatus 400. Thereby, the broker server 300 can grasp the transmission topic to be registered.
(Broker Server)

The controller 301 receives the request information from the communication apparatus 400 by the specific communication, by the communication unit 302. The broker server 300 registers the apparatus ID of the communication apparatus 400, the transmission topic, and the transmission destination of information to the communication apparatus 400 that are included in the request information. Thereby, when receiving the specific information with which the transmission topic is associated, the broker server 300 can identify the communication apparatus 400 as a transmission destination of the specific information by referring to the topic fields held in the topic information DB 303.
(Flow of Information Processing)

Figure 6:
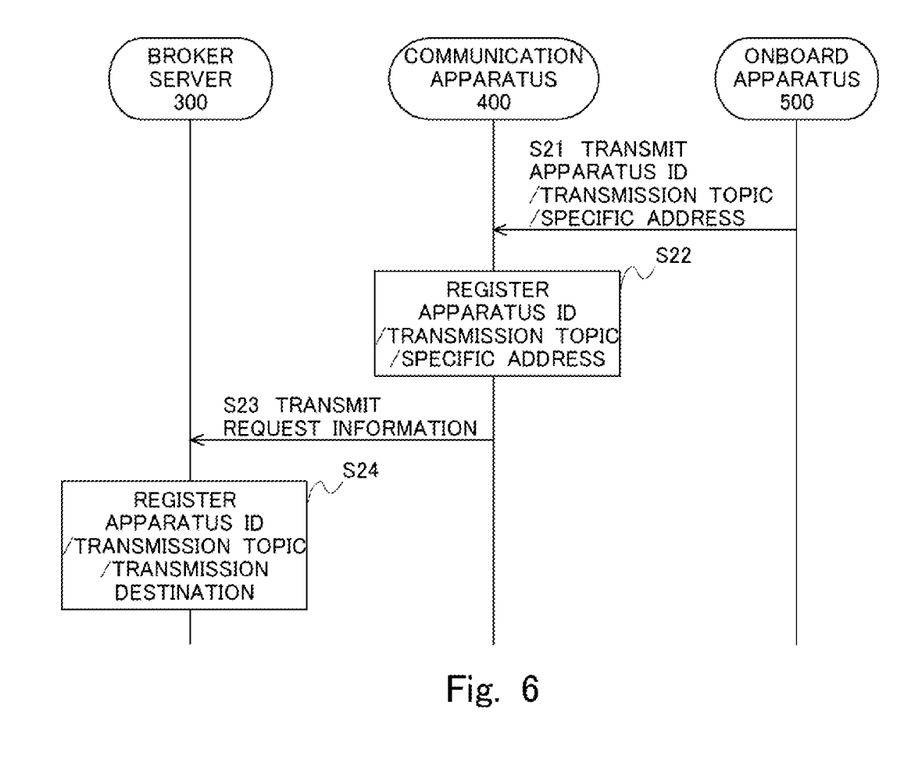
FIG. 6 is a second sequence diagram illustrating a flow of information processing in the communication system.

Next, a flow of information processing in the communication system 1 will be described based on FIG. 6. FIG. 6 is a second sequence diagram illustrating the flow of the information processing in the communication system 1. Processes executed by the broker server 300, the communication apparatus 400, and the onboard apparatus 500 are executed by the controller 301, the controller 401, and the controller 501, respectively.

In the communication system 1, the onboard apparatus 500 transmits the apparatus ID, the transmission topic, and the specific address to the communication apparatus 400 via the in-vehicle network (S21). Next, the communication apparatus 400 registers the apparatus ID, the transmission topic, and the specific address with the apparatus information DB 404. Thereby, it becomes possible for the communication apparatus 400 to, when receiving specific information with which the transmission topic is associated, from the broker server 300 by the specific communication, transmit the specific information to the onboard apparatus 500.

Then, the communication apparatus 400 transmits request information to the broker server 300 (S23). Next, the broker server 300 registers the apparatus ID, the transmission topic, and the transmission destination that are included in the request information, with the topic information DB 503 (S24). Thereby, it becomes possible for the broker server 300 to, when receiving the specific information with which the transmission topic is associated, from the publisher server 200 by the specific communication, transmit the specific information and the transmission topic to the onboard apparatus 400.

As described above, in the second embodiment, the onboard apparatus 500 transmits the transmission topic and the specific address to the communication apparatus 400 in the communication system 1. Thereby, it becomes possible for the communication apparatus 400 to transmit the specific information to the onboard apparatus 500. Especially, it becomes possible to, even when there are a plurality of onboard apparatuses 500 in a vehicle, transmit specific information to an appropriate onboard apparatus 500.

Further, in the communication system 1, the communication apparatus 400 transmits the request information to the broker server 300. Thereby, it becomes possible for the communication apparatus 400 to receive the specific information from the broker server 300 by the specific communication and for the external apparatus 100 to transmit the specific information to the onboard apparatus 500. Then, it becomes possible for the communication apparatus 400 to transmit the notification information to the external apparatus 100. As a result, it becomes possible to confirm that the onboard apparatus 500 has completed reception of the specific information.
(Modification)

In the present modification, the communication apparatus 400 erases the apparatus information held in the apparatus information DB 404 at a predetermined timing. Here, the predetermined timing is, for example, the timing of a power source for the communication apparatus 400 being turned off. The predetermined timing may be, for example, the timing of a predetermined cycle arriving. Hereinafter, only points different from the second embodiment will be described.
(Erasure Process)

Figure 7:
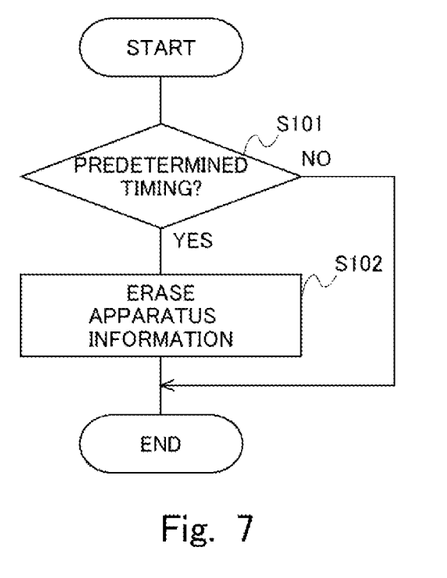
FIG. 7 is a flowchart of an erasure process.

An erasure process executed by the controller 401 of the communication apparatus 400 in the communication system 1 will be described based on FIG. 7. The erasure process is a process for erasing the apparatus information held in the apparatus information DB 404. The erasure process is repeatedly executed at predetermined intervals. FIG. 7 is a flowchart of the erasure process.

In the erasure process, first, it is determined at 5101 whether the predetermined timing has arrived or not. If an affirmative determination is made at 5101, the apparatus information held in the apparatus information DB 404 is erased. Then, the erasure process is ended once. If a negative determination is made at 5101, the apparatus information held in the apparatus information DB 404 is not at the timing of being erased. Therefore, the erasure process is ended once.

As described above, in the present modification, the apparatus information held in the apparatus information DB 404 is erased at the predetermined timing. Therefore, the communication apparatus 400 does not have to always hold information requiring security, which is necessary to transmit information to the onboard apparatus 500. When the vehicle 50 has a plurality of apparatuses, a case is assumed where the amount of data of the apparatus information held in the apparatus information DB 404 becomes huge. However, since the apparatus information held in the apparatus information DB 404 is erased at the predetermined timing, it is possible to prevent the data amount of the apparatus information held in the apparatus information DB 404 from becoming huge.

Further, even if the apparatus information held in the apparatus information DB 404 is erased at the predetermined timing, the transmission topic and the specific address are transmitted to the communication apparatus 400 at the timing of the onboard apparatus 500 needing reception of specific information. Therefore, it becomes possible for the communication apparatus 400 to receive the specific information from the broker server 300 by the specific communication and for the external apparatus 100 to transmit the specific information to the onboard apparatus 500. Then, it becomes possible for the communication apparatus 400 to transmit notification information to the external apparatus 100. As a result, it becomes possible to confirm that the specific information has been transmitted to the onboard apparatus 500.

Other Embodiments

The above embodiments are mere examples, and the present disclosure can be implemented, being appropriately changed within a range not departing from its spirit. Further, the processes and means described in the present disclosure can be freely combined and implemented as far as technical contradiction does not occur.

Further, a process described as being performed by one apparatus may be shared and executed by a plurality of apparatuses. Or alternatively, processes described as being performed by different apparatuses may be executed by one apparatus. In a computer system, by what hardware configuration (server configuration) each function is realized can be flexibly changed.

The present disclosure can be realized by supplying a computer program implemented with the functions described in the above embodiments to a computer, and one or more processors of the computer reading out and executing the program. Such a computer program may be provided for the computer by a non-transitory computer-readable storage medium connectable to a system bus of the computer or may be provided for the computer via a network. As the non-transitory computer-readable storage medium, for example, any type of disk such as a magnetic disk (a floppy (registered trademark) disk, a hard disk drive (HDD), or the like) and an optical disc (a CD-ROM, a DVD disc, a Blu-ray disc, or the like), and any type of medium that is appropriate for storing electronic commands like a read-only memory (ROM), a random-access memory (RAM), an EPROM, an EEPROM, a magnetic card, a flash memory, or an optical card are included.

What is claimed is:

1. A communication apparatus mounted on a vehicle and performing specific communication according to an MQTT protocol, the communication apparatus comprising a controller comprising at least one processor configured to execute:
   receiving first information transmitted to an onboard apparatus mounted on the vehicle from an external apparatus, which is a transmission source of the first information, by the specific communication;
   transmitting the received first information to the onboard apparatus;
   receiving second information showing that the onboard apparatus has completed reception of the first information, from the onboard apparatus; and
   transmitting, when receiving the second information, third information notifying that the onboard apparatus has completed reception of the first information, to the external apparatus by the specific communication,
   wherein
   the controller further executes:
   receiving fourth information that is information associating a second topic specifying the onboard apparatus, which is a transmission destination of the first information, with a network address of the onboard apparatus within the vehicle; and
   registering the fourth information with a database; and
   when receiving the first information with which the second topic included in the fourth information registered with the database is associated, by the specific communication, the controller transmits the first information, with the network address corresponding to the second topic as the destination.

2. The communication apparatus according to claim 1, wherein the controller transmits a first topic specifying the external apparatus, which is a transmission destination of the third information, in association with the third information, to a first server apparatus configured to relay transmission of the third information to the external apparatus.

3. The communication apparatus according to claim 2, wherein the first topic is transmitted from the external apparatus, being in association with the first information.

4. The communication apparatus according to claim 2, wherein the controller acquires the first topic that is determined in advance, from the database.

5. The communication apparatus according to claim 1, wherein the controller further executes transmitting fifth information requesting a second server apparatus configured to relay transmission of the first information by the specific communication to register the communication apparatus as a subscriber of the second topic included in the fourth information.

6. The communication apparatus according to claim 1, wherein the controller further executes erasing the fourth information from the database at a predetermined timing.

7. An information processing method executed by a communication apparatus mounted on a vehicle and performing specific communication according to an MQTT protocol, the information processing method comprising:

receiving first information transmitted to an onboard apparatus mounted on the vehicle from an external apparatus, which is a transmission source of the first information, by the specific communication;

transmitting the received first information to the onboard apparatus;

receiving second information showing that the onboard apparatus has completed reception of the first information, from the onboard apparatus; and transmitting, when receiving the second information, third information notifying that the onboard apparatus has completed reception of the first information, to the external apparatus by the specific communication, wherein the information processing method further comprises:

receiving fourth information that is information associating a second topic specifying the onboard apparatus, which is a transmission destination of the first information, with a network address of the onboard apparatus within the vehicle; and registering the fourth information with a database; and when receiving the first information with which the second topic included in the fourth information registered with the database is associated, by the specific communication, transmitting the first information, with the network address corresponding to the second topic as the destination.

8. The information processing method according to claim 7, wherein a first topic specifying the external apparatus, which is a transmission destination of the third information, is transmitted in association with the third information, to a first server apparatus configured to relay transmission of the third information to the external apparatus.

9. The information processing method according to claim 8, wherein the first topic is transmitted from the external apparatus, being in association with the first information.

10. The information processing method according to claim 8, wherein the first topic that is determined in advance is acquired from the database.

11. The information processing method according to claim 7, further comprising transmitting fifth information requesting a second server apparatus configured to relay transmission of the first information by the specific communication to register the communication apparatus as a subscriber of the second topic included in the fourth information.

12. The information processing method according to claim 7, further comprising erasing the fourth information from the database at a predetermined timing.

* * * * *